(12) United States Patent
Saad et al.

(10) Patent No.: US 11,599,559 B2
(45) Date of Patent: Mar. 7, 2023

(54) CLOUD IMAGE REPLICATION OF CLIENT DEVICES

(71) Applicant: EMC IP Holding Company LLC, Hopkinton, MA (US)

(72) Inventors: Yossef Saad, Ganei Tikva (IL); David Zlotnick, Tel Aviv (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 887 days.

(21) Appl. No.: 16/389,771

(22) Filed: Apr. 19, 2019

(65) Prior Publication Data

US 2020/0334275 A1 Oct. 22, 2020

(51) Int. Cl.

| G06F 11/00 | (2006.01) |
|---|---|
| G06F 16/27 | (2019.01) |
| G06F 9/455 | (2018.01) |
| G06F 11/14 | (2006.01) |
| G06F 16/10 | (2019.01) |
| G06F 11/20 | (2006.01) |

(52) U.S. Cl.
CPC ........ G06F 16/275 (2019.01); G06F 9/45558 (2013.01); G06F 11/1417 (2013.01); G06F 11/1469 (2013.01); G06F 11/2094 (2013.01); G06F 16/10 (2019.01); *G06F 2009/45575* (2013.01); *G06F 2009/45595* (2013.01)

(58) Field of Classification Search
CPC ............. G06F 11/1417; G06F 11/1469; G06F 11/1446; G06F 11/1451; G06F 11/1453; G06F 11/1471; G06F 11/2097; G06F 11/2094; G06F 9/45558; G06F 16/275; G06F 16/10; G06F 2009/45575; G06F 2009/45595; G06F 2201/855

USPC .......................................................... 714/1–57
See application file for complete search history.

(56) References Cited

U.S. PATENT DOCUMENTS

| 6,385,707 B1 * | 5/2002 | Maffezzoni | G06F 11/1469 211/112 |
|---|---|---|---|
| 6,704,885 B1 * | 3/2004 | Salas-Meza | H04L 67/55 714/E11.124 |
| 7,024,581 B1 * | 4/2006 | Wang | G06F 21/57 714/38.14 |
| 8,874,527 B2 | 10/2014 | Gardner et al. | |
| 9,563,517 B1 * | 2/2017 | Natanzon | G06F 11/1451 |
| 2004/0236984 A1 * | 11/2004 | Yamasaki | G06F 11/2071 711/114 |
| 2007/0088973 A1 * | 4/2007 | Passedni | G06F 11/1435 714/6.1 |

(Continued)

OTHER PUBLICATIONS

PCT/US2019/066868, May 13, 2020, International Search Report and Written Opinion.

*Primary Examiner* — Sarai E Butler
(74) *Attorney, Agent, or Firm* — Workman Nydegger

(57) ABSTRACT

Systems and methods for replicating a device image to a storage such as the cloud. The cloud is seeded with a base image that corresponds to the device. Changes between the contents of the device and the base image are identified, uploaded to the cloud, and applied to the image. The changes are tracked continuously and the image in the cloud can thus be used to restore the device to any point in time. The cloud image can also be used in a cloud based virtual machine that provides a user of the device with access to the device's contents via the cloud based image.

20 Claims, 3 Drawing Sheets

(56) References Cited

U.S. PATENT DOCUMENTS

| | | | | |
|---|---|---|---|---|
| 2013/0346803 A1* | 12/2013 | Chiruvolu | ........... | G06F 11/3688 |
| | | | | 714/37 |
| 2014/0181575 A1* | 6/2014 | Kalach | ................ | G06F 11/1415 |
| | | | | 714/6.11 |
| 2014/0250079 A1* | 9/2014 | Gardner | .............. | G06F 11/1453 |
| | | | | 707/646 |
| 2015/0363279 A1* | 12/2015 | Maekawa | ........... | G06F 9/45558 |
| | | | | 714/19 |
| 2016/0048408 A1* | 2/2016 | Madhu | .................. | H04L 47/783 |
| | | | | 718/1 |
| 2016/0132401 A1* | 5/2016 | O'Hare | ................ | G06F 9/3834 |
| | | | | 714/15 |
| 2017/0075907 A1* | 3/2017 | Goswami | ........... | G06F 11/0751 |
| 2018/0173552 A1* | 6/2018 | Prinsloo | ............. | G06F 9/45558 |

\* cited by examiner

CLOUD IMAGE REPLICATION OF CLIENT DEVICES

FIELD OF THE INVENTION

Embodiments of the invention relate to systems, methods, and apparatus for protecting data. Embodiments of the invention more specifically relate to systems and methods for replicating images of client devices or of client storage devices. Embodiments of the invention further relate to systems and methods for replicating images of client devices while allowing use of the client devices.

BACKGROUND

Client devices, such as desktop computers and laptop computers, are used extensively for personal and business needs. These devices often store data that is significant to the users of the devices and/or associated entities. The data may include content such as files of various types, user-data, applications and data commonly found on user devices. Client devices are also used for communicating with others (e.g., email) and connecting to the world (e.g., Internet, remote data access). Notwithstanding their importance, many of these machines are not sufficiently protected. In fact, it is very difficult to transfer the personal/business use from one device to another device.

In other words, there is a distinction between the use of the device and the data that may be stored on the device. There are many ways to protect certain types of data such as files and many ways to recover this type of data. However, these solutions do not adequately address situations where the device is unavailable, destroyed, encrypted (e.g., ransomware), or forgotten (e.g., left at home or on plane). The ability to recover files does not help when the device itself is unavailable. There is no easy way to recover the device in these situations without rebuilding the environment on a new or on the same device. The user's data or files can be recovered only after the environment is rebuilt.

More specifically, file-based backup/recovery solutions have significant drawbacks for client devices. When the device is unavailable, or needs to be completely restored, the reconstruction of the device takes a substantial amount of time due to the need to: re-image the operating system (OS) (or reinstall the OS), apply all updates and patches to the OS, configure the environment parameters, install all applications from original disks/iso, and apply all updates/patches to applications. Only when this is completed can the user's files be recovered. Further, when the device is replaced, the complete process for recovery is required.

For every change in file based recovery systems, it is often necessary to copy the full file. This can be time consuming and create significant network traffic. Further, solutions that are able to create an image of the device cannot run while the system is working (because the disk is changing). In addition, conventional image based recovery solutions often require that the device boot from an external drive. Ensuring that the external drive is properly set up can also be problematic and difficult.

In addition, these processes result in copies that are not continuous and that correspond to specific points in time. The user is, as a result, exposed between backups. It also complicates the copy creation and the recovery, because these recovery operations are intrusive and complex procedures that are not streamlined with the device operation.

Consequently, restoring a device such as an end user device can take a very long time and can be quite complex.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, data synchronization operations, image creation operations, cloud-based image replication operations, or the like or combination thereof. More particularly, embodiments of the invention relate to systems, hardware, software, computer-readable media, and methods for performing data protection operations.

More specifically, embodiments of the invention relate to systems and methods for replicating images of client devices to a target site such as a public or a private cloud. Embodiments of the invention further relate to replicating images of client devices to the cloud with online continuous data copy and while allowing use of the device. Thus, embodiments of the invention are able to replicate an image to the cloud even when the data at the client is changing. In addition, embodiments of the invention simplify the initial replication of a full device image to the cloud and reduce data transfer requirements at least for the initial image.

Embodiments of the invention enable a full backup (an image) of a device to be generated and stored on a local/cloud storage while the device is in use. The image is a continuous image that uses snapshots or a journal mechanism, compared to backups that have gaps in time, and the continuous image allows a restore to be performed at selected points in time. Embodiments of the invention further allow an image to be restored to the original device or a different device more easily and without the need to boot from an external device.

In one example, an image is a copy (often an exact copy), of the entire contents of a storage device, such as a hard drive. The disk image may represent the content of the original storage device exactly. As a result, restoring a device from an image places the device in a condition that corresponds to a time at which the image was generated.

Embodiments of the invention allow images including point in time and continuous images to be generated. A continuous image, in one example, allows a device to be restored on a per transaction basis, which has a finer granularity than periodic images. In one example, snapshots or a type of snapshot may be used. By applying the snapshots to a starting or base image, images of the device at different points in time can be achieved.

In one example, the snapshot includes changes to the device that have occurred since a previous snapshot. All or some of the transactions in the snapshot can be applied to an existing image. A series of incremental snapshots can be applied to an existing image to generate an updated image. By tracking changes to the device, an image can be created on a per transaction basis and can be configured for any selected point in time.

Figure 1:
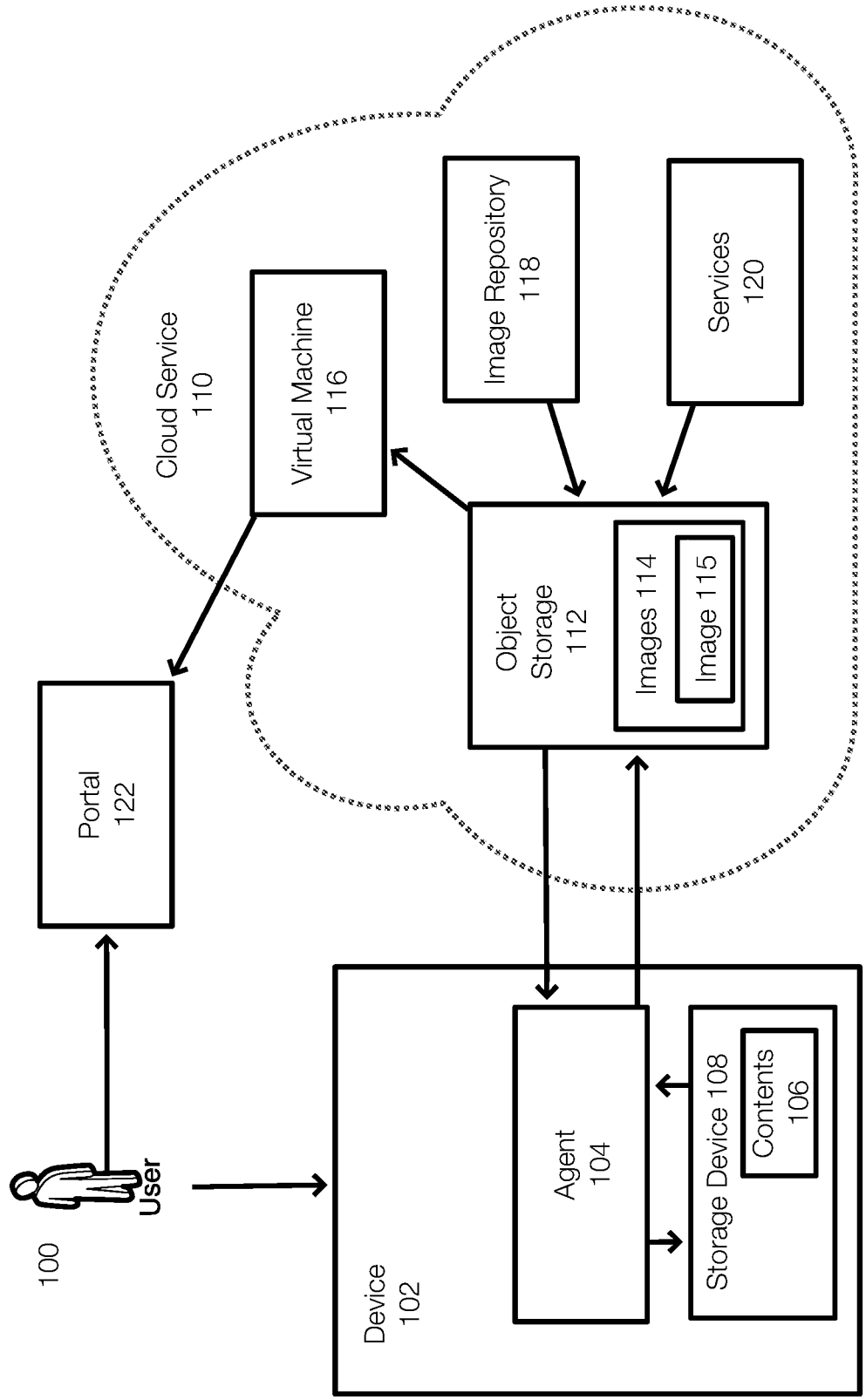
FIG. 1 illustrates an example of an architecture or system for replicating client devices images to the cloud or other storage location.

FIG. 1 illustrates an example of systems and methods for protecting data of a device. More specifically, FIG. 1 illustrates and example of systems and methods for replicating an image of the device to the cloud.

FIG. 1 illustrates a device 102 associated with a user 100. The device 102 may be a computing device such as, but not limited to, a desktop computer, a laptop computer, a tablet or phone device, or the like. Each of these devices includes a processor and associated circuitry. The device 102 includes a one or more storage device 108 on which contents 106 are stored. An image of the device 108 may include an exact copy of all of the contents 106 on the device 102.

In this example, the contents 106 may include various types of data such as an operating system, applications, user data (e.g., files, on the desktop or in a documents folder, emails), or the like. A "C drive" is an example of a storage device associated with the device 102 and the contents 106 is an example of all data that may be stored on a C drive. Thus, the contents 106 may have different types of data that have different purposes. The device 102 typically boots from the storage device in one example.

FIG. 1 also illustrates a cloud service 110. In this example, the cloud service 110 may be implemented in a cloud (e.g., a datacenter) that can allocate computing resources such as processors, memory, network devices, and the like as needed to the cloud service 110. The cloud service 110 may be implemented using physical or virtual machines, microservices, servers, or the like.

In this example, the cloud service 110 may provide or include an object storage 112 that may be used to store images 114 of the multiple devices including the device 102. For an entity that has or is associated with many user devices, the images of all of these devices (or selected devices) may all be stored in the images 114.

In this example, an image of the contents 106 of the device 102 is stored in images 114 in object storage 112 as the image 115. The image 115 may also be representative of multiple images of the device 102 in various points in time. In one example, embodiments of the invention do not require the image 115 to be an exact replica of the contents 106 as long as a replica of the contents 106 can be generated from the image 115. For example, the image 115 may be stored as a series of filed or objects that can be combined to generate an image of the contents 106.

This allows the image 115 (and the images 114) to be stored in different manners and configurations. For example, the image 115 can be compressed or encrypted. In addition, the image 115 may be composed of a base image (discussed in more detail below) and one or more snapshots or differentials. When needed, a desired point-in-time image can be generated from the base image and the one or more snapshots as appropriate. In another example, each snapshot may correspond to a specific image of the device 102.

The cloud service 110 may also include or have access to an image repository 118. The image repository 118 may store a plurality of seed images. The image repository 118 allows an initial or starting image of the device 102 to be created with less data transfer from the device 102. The seed images correspond, in one example, to the contents of various devices when the various devices are new. An entity, for example, may provision its devices from a small set of known images. Whenever a new device is distributed, for example, one of these images may be loaded onto the new device.

A seed image may include an operating system, various applications, a set of standard data or tools, or the like. When replicating an image of the device 102, the image repository 118 may provide a seed image that forms the base image of the device 105. The image 115 of the device 102 is then generated from this base image. By seeding the image 115, it is only necessary to transfer the differences between the contents 106 and the seed image and then apply the changes to the seed image to arrive at an initial or base image of the device 102. The image 115 can then be updated by tracking subsequent changes to the device 102.

Seeding the images 114 solves a problem related to the initial replication of a full device image to the cloud service 110. In order to efficiently transmit the initial copy or image of the device, the image repository 118 may store several seed images as previously stated for various operating systems. The seed images may include, by way of example only, images that include various versions of Windows, Linux, Unix, etc. These images may also include applications and/or other data. In this example, one of the seed images in the image repository 118 may correspond to an image of the device 102 when the device 102 was new. The seed image can then be updated with changes that have occurred at the device 102 to arrive at a current image of the device. This can be achieved by identifying the changes that have occurred at the device 102.

In one example, an agent 104 may be installed on the device 102. The agent 104 can be installed during manufacture of the device 102 or at a later time. Embodiments of the invention can be performed even if the agent 104 is installed on the device 102 after the device 102 has been in use for some period of time.

The agent 104 may detect the base image installed on the device 102 (e.g., by identifying the OS version) that corresponds to one of the seed images stored in the image repository 118. When establishing or generating the initial image of the device 102, the contents 106 then be compared to the corresponding seed image that serves as the best match for a base image. Only the blocks that have changed relative to the image 115 will be sent over the network to the cloud storage. The changed blocks can then be incorporated into the image 115. Once the initial image 115 is completed, subsequent updates may only require the identification of changes at the device 102. These changes can simply be applied to the current image 115. Advantageously, an image of the device 102 can be taken even though the device 102 is being used and the contents 106 are changing.

In one example, the agent 104 may be software that is installed on the device 102. The agent 104 may be installed at the operating system level. This allows the agent 104 to intercept all write transactions on the device 102 and replicate those changes to the object storage 112 and to a journal (and eventually to the image 115). This can be done while the device 102 operates in a normal manner.

In one example, the device 102 is protected by storing the image 115 of the device 102 in a remote location such as the cloud or a local storage location (the storage may be an on-premise storage). As previously stated, the base image stored in the cloud may be based on an image from the image repository 118. This seed image that may corresponds to the image used to originally provision the device 102 can serve as a basis for subsequent images. In addition, this allows an image to be uploaded to or created in the cloud without having to transfer a substantial portion of the data at the device.

In this example, the image 115 initially corresponds to a seed image from the image repository 118. While generating the initial image for the device, identifying the changes at the device 102 can be performed by the agent 104. In one example, the agent 104 may examiner chunks or blocks of the data 106 (e.g., in 4 MB or other configurable sized chunks). More specifically in one example, because an image is being created, this process is examining blocks on the device. Each chunk may thus correspond to a specific portion of the storage device 108. This allows an exact replica to be constructed as the image 115.

A checksum for these chunks can be determined and compared to a checksum of corresponding chunks in the image 115. When the checksum from the device 102 does not match the corresponding checksum from the image 115, the chunk in the image 115 is replaced with the chunk from the device 102. This allows the image 115 to be updated with changes that are detected at the device 102 to generate the initial image 115 of the device 102.

Thus, the image 115 may be seeded or start with a seed image selected from the image repository 118 and serve as a base image. Then, the agent 104 may identify the blocks that have changed at the device 102 relative to the base image. These changes identified at the client 102 are transmitted and incorporated into the image 115. This reduces the amount of data transfer to initially create an image for storage in the cloud because the base or seed image is not transmitted from the device 102.

If the agent 104 is installed after changes have already been made at the device 102, the changes relative to a base image from the image repository 118 can still be determined in a similar manner, using a full sweep of the client storage device 108.

While generating or updating the image 115, the agent 104 automatically sends data over a network such as the Internet to the cloud. The data may be transferred in periodic intervals. In effect, the agent 104 may create a differential or a snapshot that identifies changes or that contain the deltas of the changed blocks that have been written since the last snapshot.

These periodic snapshots or differentials can be stored in the cloud object storage 112. These periodic snapshots also allow images to be produced at different points in time. Based on the changes in or identified by a snapshot, the device image can be a continuous image.

If there is a need to restore the device 102, the image 115 (and/or the snapshots) can be used to restore the device 102 to a selected point-in-time. Alternatively, when the entire device is lost (e.g., not available), the image 115 can be restored a new device, which may be a similar model or have a similar configuration to the device that is lost or not available.

In one example, the restore process is achieved by including an option in a menu of a recovery partition to "restore the disk from the cloud". This allows a user to boot the device 102 through a restore process (e.g., by pressing a function key during a device boot sequence, to interrupt the normal boot sequence) and select the restore from the cloud option. Advantageously, there is no need to create a bootable media, perform a special boot process, or the like. When the restore from the cloud option is selected, the image 115 can be copied to the device 102 and the device 102 can then be restarted and booted after the copy completes.

The images 114 also allow an image of the device 102 to be reconstructed in the cloud and launched, for example, as a virtual machine 116. Using a portal 122, this allows the user 100 to have access to his/her device and have remote access to the contents 106 via the image stored in the cloud, including the software and other applications, in a virtual desktop via the portal 122. The remote access in this example can be read only or read/write. If changes are made to the cloud copy, these changes are synchronized back to the device 102 by the agent 104 at an appropriate time.

Thus, FIG. 1 illustrates an example system or architecture where an agent 104 is stored on a device 102. The agent 104 performs a replication operation. An image of the device 102 is created in the cloud by initially comparing the device 102 (or more specifically the contents 106) to a seed image selected from an image repository 118 and then identifying and sending the initial delta and periodic differentials or snapshots. The cloud image can then be used to restore the device 102 to a point in time or to spin a virtual machine 116 in the cloud based on the backup image 115 to provide remote access when the source device 102 is unavailable.

Figure 2:
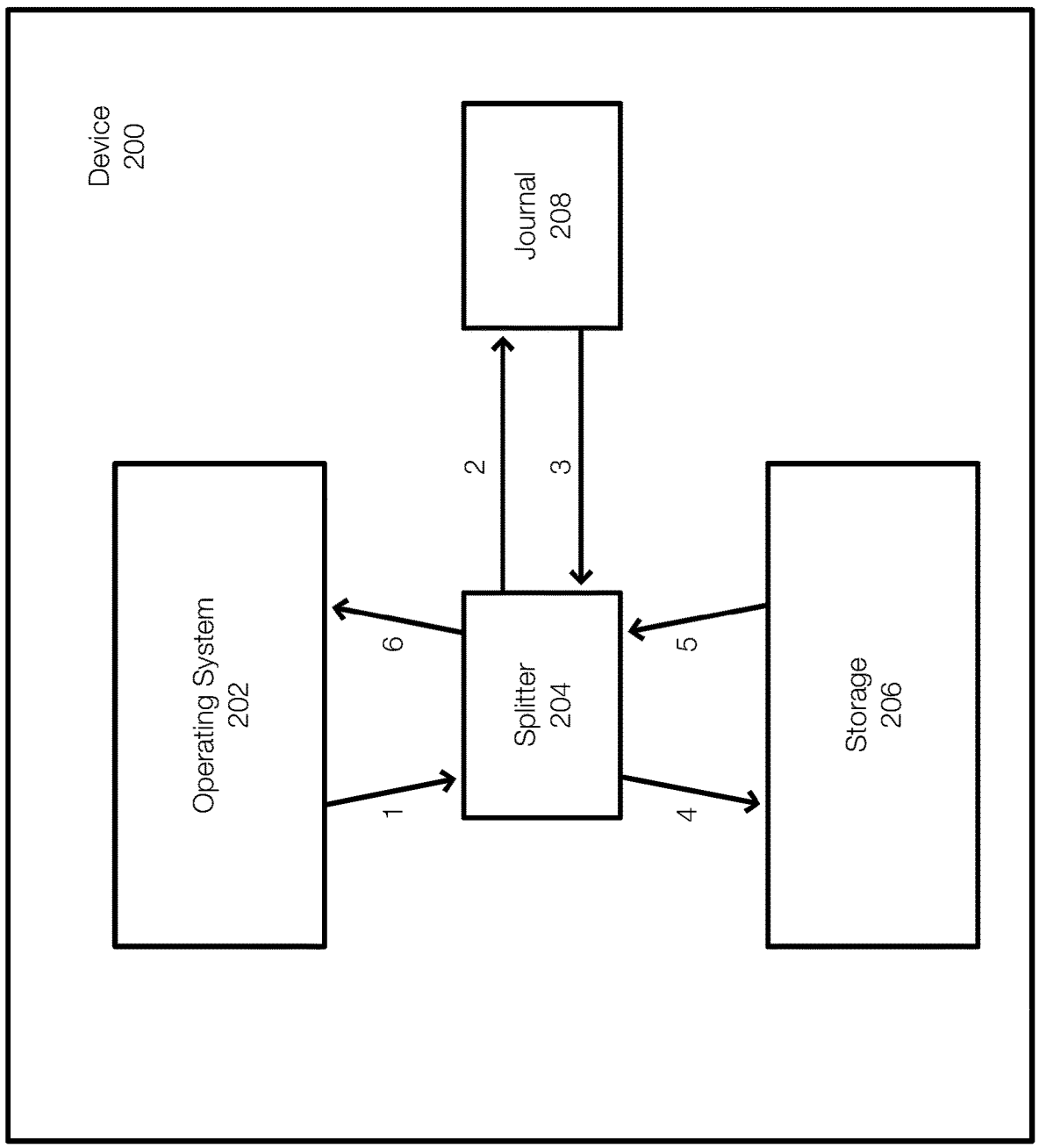
FIG. 2 illustrates an example of an agent configured to intercept and track changes made to data on a device.

FIG. 2 illustrates an example of an agent operating on a device. In Figure a splitter 204 (an example of the agent 104) is effectively positioned between an operating system 202 and storage 206 on a device 200. When the operating system 202 sends (1) a write to the storage 206 or to a disk, the splitter 204 intercepts (2) the write and sends the write to a snapshot in a journal 208. The journal write is then acknowledged (3). The splitter 204 then sends (4) the write to the storage 206. The storage 206 acknowledges (5) the write and the splitter 204 acknowledges (6) the write to the operating system 202. Updates to the image 115 can be created from the journal 208. In one example, the journal 208 identifies the blocks that have changed and these blocks or the delta between these blocks and the corresponding blocks in the image 115 can be uploaded and applied to the image 115.

Replication the image of a device, such as the device 102, may involve two stages. The first stage is to establish the initial image in the cloud service 110. This is achieved in one example, as previously discussed, by seeding the image 115 and then performing a sweep of the storage device 108. This sweep may generate checksums for every chunk (e.g. 4 MB blocks) of space on the storage device 108. These checksums can be compared to checksums of corresponding locations in the image 115. Only the chunks whose checksums do not match are uploaded to the image 115. This substantially reduces transfer over the network from the device to the cloud service. The sweep may be performed by the agent or splitter after installation of the agent or splitter.

There may be situations where a sweep is again performed, such as in extreme failure scenarios or where there is reason to believe that the journal is not accurate.

In one example, the journal may store pointers to changed blocks. Thus, the journal may be a bitmap. When a snapshot is performed, the changed blocks identified by the pointers are uploaded to the image 115. With this approach, the journal does not create a full local "snapshot", but instead has a bitmap representing the changed blocks, which are then being periodically transmitted to the cloud to build the differential from the previous snapshot. Alternatively, the changed data can be copied to the journal. To the extent this approach is used in a situation where a device may have multiple storage devices, it may be more efficient to copy the changed data to the journal.

Thus, the journal allows differentials to be stored with the image or incorporated into the image.

Figures 3, 4:
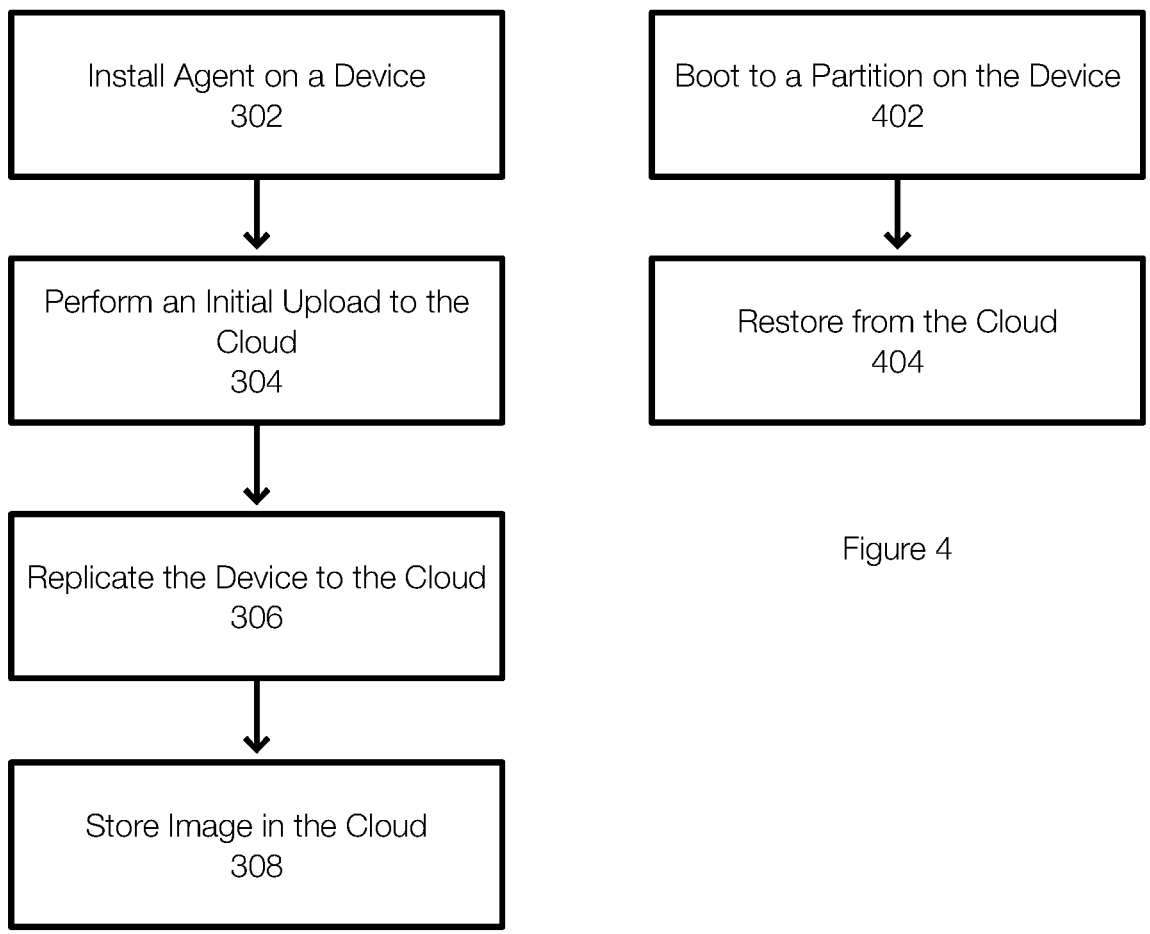
FIG. 3 is an example of a method for replicating client images to the cloud or other storage location.
FIG. 4 is an example of a method for restoring an image to a device.

FIG. 3 illustrates an example of an image replication method. In FIG. 3, an agent is installed 302 on a device. The agent can be installed when the device is manufactured or at a later point in time. For example, the agent may be installed after changes have already been made to the device.

Next, an initial upload of an image to the cloud is performed 304. The initial upload does not require all data or contents on the device to be uploaded. Rather, the initial upload only transmits blocks that are different. More specifically, the contents of the device may be compared to the contents of a matching seed image. Only the differential needs to be uploaded such that the seed image is transformed into a replica of the contents at the device.

During the initial synchronization or while generating the initial image in the cloud, which is done by uploading the differential between the contents of the device and a base or seed image, the entire device may be swept by the agent. This process may be done on a block or set of blocks basis or on a chunk basis. A checksum or other identifier of the blocks or chunks at the device may be compared with a corresponding checksum or other identifier of the backup image in the cloud. When the checksums or identifiers do not match, the corresponding blocks or chunks or the specific changes are uploaded to the cloud and applied to the initial seed image. When this process is completed, the initial image is complete. The image can be stored as an object or in another format.

After the initial backup image is created, changes to the contents of the device are replicated 306 to the cloud. This includes changes not only to the files, but also to the operating system, applications, or the like at least because one goal is to store an image of the device, which is different from a backup of the user files on the devices. This may include intercepting writes to the storage device and storing changes in a change journal. On a periodic basis or other schedule, the journal or changes stored in or identified by the journal can be uploaded. In one example, snapshots can be taken of the device or of the journal and uploaded to the cloud. These snapshots can be associated with the image stored in the cloud or incorporated into the image stored in the cloud. By intercepting writes, the device is continually protected and can be restored to any point in time. Thus, the image is stored 308 in the cloud as an image, a set of images, an image and a series of snapshots, or the like. Over time, the data may be consolidated (and storage space conserved) by removing older snapshots or older images.

FIG. 4 illustrates an example of restoring an image to a device. In one example, the device is booted 402 to a special partition (e.g., safe mode or recovery mode). A menu item may be added to this mode that allows recovery from the cloud. When this option is selected, the image is restored 404 from the image in the cloud. This may require the entire image to be downloaded to the device. Once the image is written, the device can be restarted normally. The same image in the cloud could also be started as a virtual machine to allow remote access to a user. Any changes could be synched back to the device.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, replication operations, image replication operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms. Further, embodiments of the invention may be implemented with cloud storage such as Dell EMC ECS or the like.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating contents of a storage device associated with a client device to a target site, the method comprising: selecting a seed image associated with the storage device from a plurality of seed images stored in an image repository and storing the seed image at the target site, wherein contents of the seed image were not transmitted to the target site from the client device; determining changes between the contents of the storage device and the seed image by comparing the contents of the storage device with contents of the seed image stored at the target site; transmitting the changes to the target site; incorporating the changes into the seed image to generate an initial image of the storage device.

2. The method of claim 1, further comprising tracking changes to the contents stored in the storage device, wherein the changes are uploaded to the target site and stored with the seed image or incorporated into the initial image to generate an image corresponding to a different point in time.

3. The method of claim 2, further comprising tracking changes by intercepting writes to the storage device, wherein the intercepted writes are recorded in a journal.

4. The method of claim 2, further comprising launching a virtual machine at the target site that is based on the image of the contents and allowing a user to remotely access the virtual machine through a web portal.

5. The method of claim 4, further comprising synching changes made through the virtual machine back to the storage device of the client device.

6. The method of claim 1, further comprising storing the changes in a journal at the client device.

7. The method of claim 1, further comprising storing pointers to the changes in the journal at the client device.

8. The method of claim 1, further comprising sweeping the storage device to evaluate each block in order to compare each block with a corresponding block in the seed image, wherein each block of the storage device whose comparison does not match, is uploaded to the target site and stored with or incorporated into the initial image.

9. The method of claim 8, wherein the comparison is performed by comparing a checksum of each block with a checksum of each corresponding block in the seed image.

10. The method of claim 1, further comprising generating the initial image while allowing user access and make changes to the contents of the storage device.

11. A method for replicating contents of a storage device of a client device to a cloud, the method comprising:
comparing contents of the storage device with contents of a seed image stored in the cloud, wherein the seed image is not transmitted from the client device;
uploading the contents of the storage device that are different from the content of the seed image to the cloud;
incorporating the uploaded contents of the storage device into the seed image to generate an initial image of the storage device; and
tracking changes at the client device and uploading the changes to the cloud; and
incorporating the tracked changes into the initial image to generate an image of the storage device that corresponds to a different point in time than the initial image.

12. The method of claim 11, further comprising intercepting writes to a storage device of the client device and storing the writes or pointers to the writes in a journal.

13. The method of claim 11, further comprising sweeping the storage device to evaluate each block in order to compare each block with a corresponding block in the seed image, wherein each block of the storage device whose comparison does not match, is uploaded to the target site and stored with or incorporated into the initial image.

14. The method of claim 13, wherein the comparison is performed by comparing a checksum of each block with a checksum of each corresponding block in the seed image.

15. The method of claim 11, further comprising launching a virtual machine at the target site that is based on the image and allowing a user remote access to the virtual machine through a web portal.

16. The method of claim 15, further comprising synching changes made through the virtual machine back to the storage device of the client device.

17. The method of claim 11, further comprising generating the image while allowing access and changes to the contents of the storage device.

18. The method of claim 11, further comprising restoring the image from the cloud to the storage device.

19. The method of claim 18, further comprising adding a menu option to a menu that allows the image to be restored from the cloud without booting the client device from an external device.

20. A non-transitory computer readable medium comprising computer executable instructions that, when executed, perform the method of claim 11.

* * * * *